Oct. 15, 1940.    J. T. MIDYETTE, JR    2,218,454
REGULATING SYSTEM
Filed July 3, 1937    2 Sheets-Sheet 1

INVENTOR.
BY John T. Midyette, Jr.
William, Rich + Morse
ATTORNEYS

Oct. 15, 1940.   J. T. MIDYETTE, JR   2,218,454
REGULATING SYSTEM
Filed July 3, 1937   2 Sheets-Sheet 2

INVENTOR.
BY John T. Midyette, Jr.
Williams, Rich + Morse
ATTORNEYS

Patented Oct. 15, 1940

2,218,454

UNITED STATES PATENT OFFICE 2,218,454

REGULATING SYSTEM

John T. Midyette, Jr., New Rochelle, N. Y., assignor to Au-Temp-Co Corporation, New York, N. Y., a corporation of New York Application July 3, 1937, Serial No. 151,822

2 Claims. (Cl. 236—74)

This invention relates generally to regulating systems of the type adapted to function in response to changes in atmospheric conditions, and is herein illustrated as embodied in a temperature regulating system which is dependent for its operation on variations in room temperature and is adapted to accordingly regulate the delivery of heat from its source to the point or location where it is to be utilized.

An important object of the present invention is to provide for modulation in the operation of regulating systems of the general type to which the present invention is directed whereby atmospheric conditions may be maintained substantially uniform between relatively close predetermined limits.

The present invention, when embodied for instance in a temperature regulating system, contemplates for example a thermostat; a motor, the operation of which may be initiated in one direction or another to open or close a furnace damper; an interrupter by which the circuit of the motor may be periodically interrupted during its cycle of operation; and means for rendering inoperative the motor circuit interrupter when abnormal room temperatures (those above and below said predetermined limits) are encountered so that the motor may uninterruptedly complete its cycle of operation provided normal temperature conditions are not restored in the meantime.

Other objects and advantages of the invention will become apparent from the following description when taken in connection with the accompanying drawings, in which—

Figure 1:
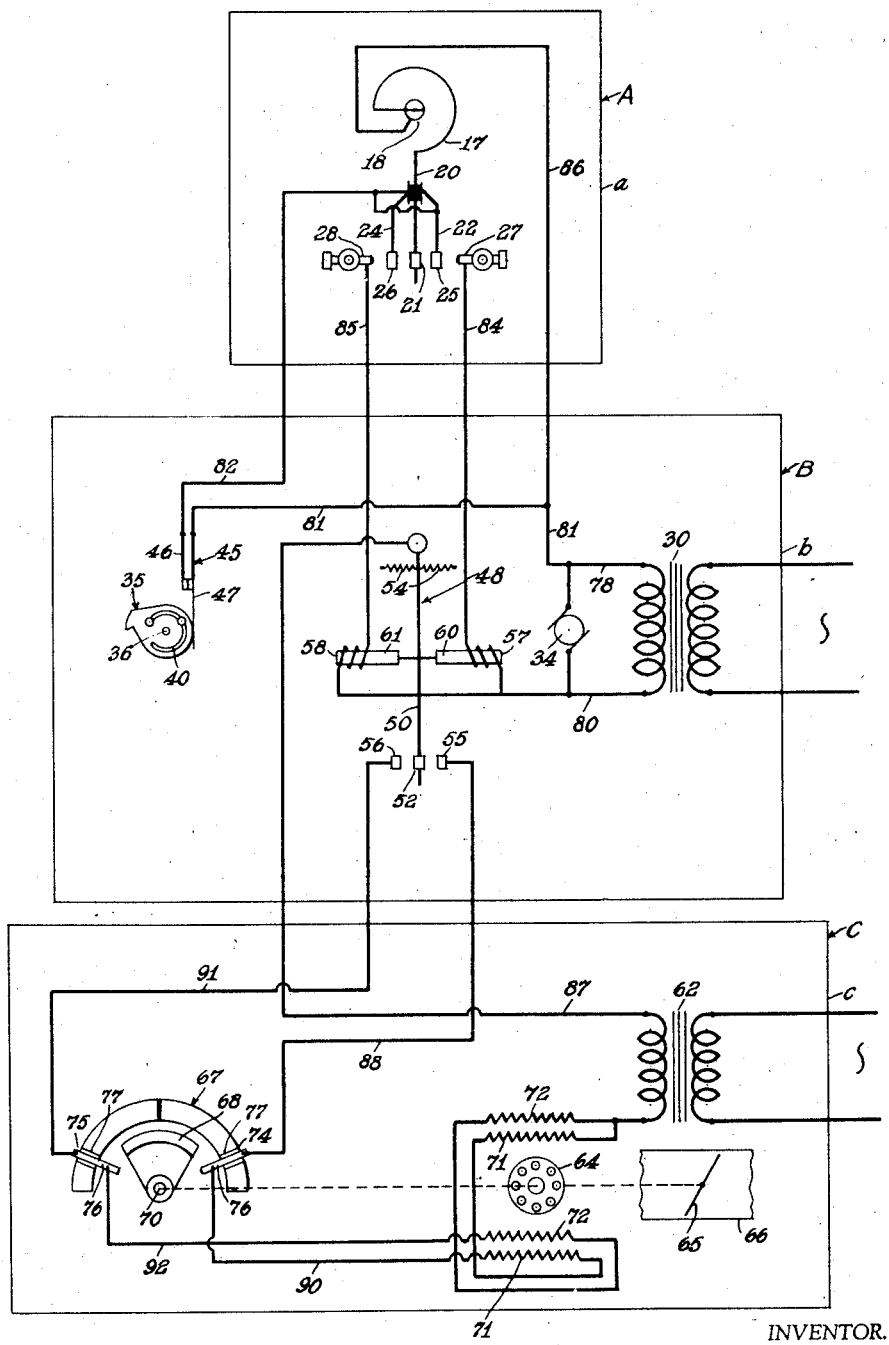
Figure 2:
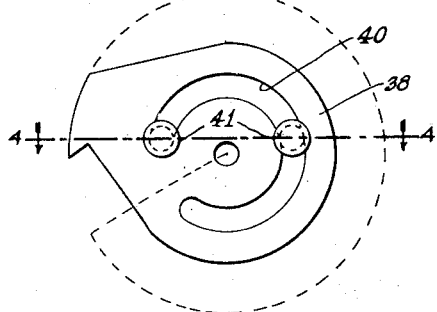
Figure 3:
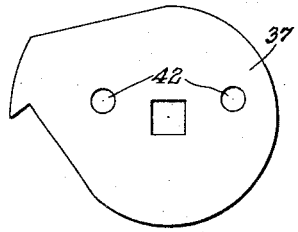
Figure 4:
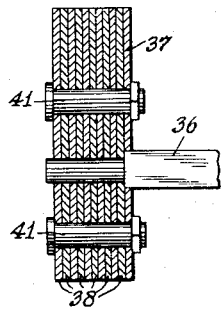
Figure 5:
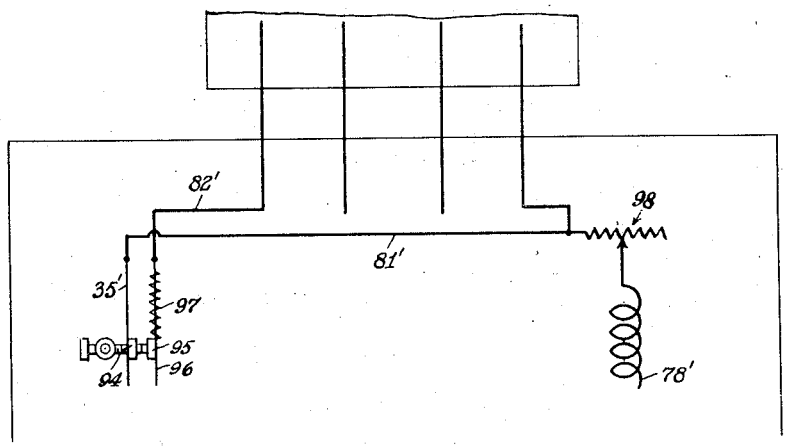

Fig. 1 is a diagrammatic view illustrating a temperature control system embodying the present invention; Fig. 2 is a front elevation of a cam assembly constituting a sub unit of a circuit interrupter; Fig. 3 is a rear elevation of the cam assembly of Fig. 2; Fig. 4 is a sectional view taken on line 4—4 of Fig. 2; and Fig. 5 is a diagrammatic view illustrating a modified form of circuit interrupter.

The system herein illustrated as embodying the present invention comprises three primary units, which will be hereinafter referred to as the thermostat unit A, the modulating relay unit B, and the motor unit C, the various elements entering into the respective units being shown as grouped within the outlines a, b and c in order to enable the units themselves to be readily and separately identified.

As to the thermostat unit A, it is illustrated herein as including a thermostat 17 of the bimetallic type, which is anchored as at 19, and the free arm 20 of which is provided with a contact 21. To the thermostat arm 20 are connected a pair of spring fingers 22 and 24 which are provided, respectively, at their free ends with contacts 25 and 26. As to the spring fingers 22 and 24, it will be observed that, although they are carried by the thermostat arm 20, they as clearly indicated in Fig. 1, are suitably insulated from that arm for reasons which will hereinafter more clearly appear. Adjacent the contacts 25 and 26, are arranged a pair of adjustable contacts 27 and 28, which may be of the thumb screw type and which are adapted to be moved toward or away from their respectively cooperatively related contacts 25 and 26 in order to predetermine the temperature limits between which substantially uniform temperature conditions are to be maintained.

Considering the modulating relay unit B, it will be observed that it includes a transformer 30, the primary winding of which may be connected to a suitable source of current, and the secondary winding of which is adapted to supply current of appropriate value to a motor 34 forming a part of a motor driven circuit interrupter 35. The circuit interrupter 35 includes a cam shaft 36, which is connected by suitable reducing gearing, not shown, to the shaft of the motor 34. On the shaft 36 is carried a cam assembly, which comprises a fixed cam 37 and a plurality of adjustable cams 38. The cams 38 are adapted to be moved to and locked in various positions of angular adjustment, and to that end each of these cams is provided with an arcuate slot 40 adapted for the reception of bolts or other suitable fastening elements 41 which are accommodated within openings 42 formed in the fixed cam 37. In the present instance, the effective cam face of the cam 37 and of each of the cams 38 is of such length that it represents 30° of rotation of the cam shaft 36, and each of the slots 40 is of such length that the cams 38 may be so adjusted that they, together with the cam 37, may be combinedly effective throughout a range of from 30° to 330°, as will be readily understood when it is taken into account that there are eleven cams in the entire assembly. The cams 37 and 38 are adapted to cooperate with a switch 45, comprising a pair of switch arms or spring contacts 46 and 47, which normally engage each other but are adapted to be periodically separated as the cams are moved into operating engagement with the switch arm 47. Preferably the motor 34 is so geared to the cam shaft 36 that such shaft will rotate at a speed of 1 R. P. M., with the result that the hereinafter-identified circuit which is under the control of the circuit interrupter 35 will be opened and closed once every minute. By providing for a maintained speed of 1 R. P. M. of the cam shaft 36, the circuit which is under the control of the circuit interrupter 35 may be maintained open for any predetermined fraction of a minute ranging from 5 to 55 seconds, and maintained closed for the remaining interval. For example, if the cams 38 are so adjusted that they register with each other and with the cam 37 the circuit will be maintained open for a period of 5 seconds and closed for a period of 55 seconds; or if the cams 38 are so adjusted that they form with each other and with the cam 37 a cam surface of maximum length (330°), the circuit will be maintained open for a period of 55 seconds and closed for a period of 5 seconds.

Referring further to the modulating relay unit B, it is herein illustrated as including a motor-control switch 48, comprising a pivotally supported switch arm 50, provided at its free end with a contact 52. The switch arm 50 is maintained normally in a neutral position by a pair of tension springs 54, suitably anchored at their outer ends and connected at their inner ends to the switch arm intermediate its pivot point and its contact 52. The switch 48 also includes a pair of stationary contacts 55 and 56, into engagement with which the contact 52 is adapted to be moved under the action of a pair of solenoids 57 and 58, the cores 60 and 61 of which are suitably connected to the switch arm 50 intermediate its pivot point and its associated contact 52.

As to the motor unit C, it is herein illustrated as including a transformer 62, the primary winding of which may be connected to a suitable source of current and the secondary winding of which is adapted to supply current, of appropriate value, to a reversible motor 64, which, as schematically illustrated, is suitably connected to the damper 65 of a furnace pipe 66 and to a limit switch 67. The limit switch 67 includes a cam 68, carried by a shaft 70 which is operatively connected to the motor 64 and adapted to be rotated in one direction or the other, depending upon whether the motor windings 71—71 or 72—72 are energized. The limit switch 67 further includes a pair of circuit interrupters 74 and 75, each of which comprises an arm 76 which is normally urged, as by spring action, into circuit closing engagement with a contact 77 and is adapted to be moved out of such engagement by the cam 68. In this connection, it will be noted that the arm 76 of the circuit interrupter 74 is moved to open circuit position under the action of the cam 68 as it moves in a clockwise direction a predetermined distance from its position shown in Fig. 1, whereas the arm 76 of the circuit interrupter 75 is moved to open circuit position under the action of the cam 68 as it moves in a counter-clockwise direction a predetermined distance from its position shown in Fig. 1.

Regarding the circuit connections for the various instrumentalities employed in the present system, it will be observed that the transformer 30 is utilized to uninterruptedly supply current, of appropriate value, to the motor 34, the circuit for which includes conductors 78 and 80 connected to the secondary of that transformer. The circuit which is under the control of the switch 45 of the circuit interrupter 35 includes a conductor 81 leading from the conductor 78 to the switch arm 47, a conductor 82 leading from the switch arm 46 to the spring fingers 22 and 24, branch conductors 84 and 85 leading from the contacts 27 and 28 to the conductor 80 by way of the windings of the respective solenoids 57 and 58.

From the circuits thus far described, it will be apparent that when the switch 45 is closed and when temperature conditions are such as to cause the thermostat arm 20 to so move that its associated contact 26 engages the contact 28, a circuit is established from one side of the secondary winding of the transformer 30 to the other side of that winding by way of a portion of the conductor 78, the conductor 81, switch arm 47, switch arm 46, conductor 82, spring finger 24, contact 26, contact 28, conductor 85 and the conductor 80. Inasmuch as the switch 45 is periodically opened and closed under the action of the cams 37 and 38, which constitute the cam assembly of the circuit interrupter 35, it follows that the circuit just described, and of which the spring finger 24 constitutes a part, will be periodically opened and closed, with the result that the solenoid 58 will be intermittently energized and de-energized. On the other hand, if temperature conditions are such that the thermostat 17 is so affected as to cause its contact 25 to engage the contact 27, the circuit then under the control of the circuit interrupter 35 will be completed from the conductor 82 to the conductor 80 by way of the spring finger 22, contact 25, contact 27 and conductor 84, in which case the solenoid 57 will be intermittently energized and de-energized inasmuch as the circuit peculiar to that solenoid will be periodically opened and closed by the switch 45 as described in connection with the circuit which is peculiar to the solenoid 58.

When abnormal room temperatures (those above and below predetermined limits) are encountered, it becomes desirable, as will hereinafter more clearly appear, to short circuit and thus render ineffective the circuit interrupter 35, and in order to effect such short circuiting the thermostat arm 20 is connected to the conductor 81 by a conductor 86. Under abnormal temperature conditions the thermostat arm 20 is adapted to so move as to cause its associated contact 21 to engage either the contact 25 or the contact 26, in which case either the solenoid 57 or the solenoid 58, as the case may be, is maintained energized until normal temperature conditions are attained and regardless of the fact that the switch 45 continues in the meantime to periodically open and close the circuit of which the conductor 82 forms a part. In this connection it will be observed that when the contact 21 engages the contact 25, a circuit is established from one side of the secondary winding of the transformer 30 to the other side of such winding by way of a portion of the conductor 78, a portion of the conductor 81, the conductor 86, the thermostat arm 20, contact 21, contact 25, contact 27, conductor 84 and conductor 80; whereas when the contact 21 engages the contact 26, the circuit is completed from the thermostat arm 20 by way of the contact 21, contact 26, contact 28 and conductor 85.

In order that the motor 64 may open the damper 65 when temperature conditions are such that the solenoid 57 is energized, in which case the switch 48 is closed with respect to its contacts 52 and 55, the secondary winding of the transformer 62 is connected by a conductor 87 to the switch arm 50, the contact 55 is connected to the contact 77 of the circuit interrupter 74 by a conductor 88, and the arm 76 of the circuit interrupter 74 is connected by a conductor 90 to the motor windings 71—71, which are in turn connected to the secondary winding of the transformer. Thus, it will be observed that when the cam 68 is out of open circuit position with respect to the circuit interrupter 74 and temperature conditions are such that the contact 52 engages the contact 55, a circuit is established from one side to the other side of the secondary winding of the transformer 62 by way of the conductor 87, switch arm 50, contact 52, contact 55, conductor 88, contact 77, arm 76, conductor 90 and motor windings 71—71, with the result that the motor 64 is so operated as to effect opening movement of the damper 65. In the event the operation of the motor 64 is in response to only a normal change in room temperature, in which case the contacts 25 and 27 are effective to the exclusion of the contact 21, the operation of the motor 64 will be intermittent due to the fact that periodic opening and closing of the switch 45 of the circuit interrupter 35 will effect intermittent operation of the solenoid 57 and consequently periodic opening and closing of the motor circuit of which the contacts 52 and 55 constitute portions. On the other hand, if the motor 64 is operated to open the damper 65 in response to abnormal temperature conditions, in which case the contact 21 engages the contact 25 and the contact 25 engages the contact 27, the solenoid 57 will be maintained energized because of the circuit interrupter 35 having been short-circuited by way of conductor 86. Regardless of whether opening of the damper 65 is effected step by step or continuously, the motor 64 is rendered inoperative the instant the damper reaches full open position inasmuch as the motor circuit is then opened by the circuit interrupter 74 under the action of the cam 68, which moves into open circuit position with relation to the circuit interrupter 74 as the damper 65 assumes its full open position.

In order that the motor 64 may close the damper 65 when temperature conditions are such that the solenoid 58 is energized, in which case the switch 48 is closed with respect to its contacts 52 and 56, the contact 56 is connected by a conductor 91 to the contact 77 of the circuit interrupter 75, and the arm 76 of the circuit interrupter 75 is connected by a conductor 92 to the motor windings 72—72, which are in turn connected to the secondary winding of the transformer 62. Thus, it will be observed that when the cam 68 is out of open circuit position with relation to the circuit interrupter 75 and temperature conditions are such that the contact 52 engages the contact 56, a circuit is established from one side to the other of the secondary winding of the transformer by way of conductor 87, switch arm 50, contact 52, contact 56, conductor 91, contact 77, arm 76, conductor 92 and motor windings 72—72, with the result that the motor 64 is so operated as to effect closing movement of the damper 65. In the event the operation of the motor 64 is in response to only a normal change in room temperature, in which case the contacts 26 and 28 are effective to the exclusion of the contact 21, the operation of the motor 64 will be intermittent due to the fact that periodic opening and closing of the switch 45 of the circuit interrupter 35 will effect intermittent operation of the solenoid 58 and consequently periodic opening and closing of the motor circuit of which the contacts 52 and 56 constitute portions. On the other hand, if the motor 64 is operated to close the damper 65 in response to abnormal temperature conditions, in which case the contact 21 engages the contact 26 and the contact 26 engages the contact 28, the solenoid 58 will be maintained energized because of the circuit interrupter 35 having been short circuited by way of conductor 86. Regardless of whether closing of the damper 65 is effected step by step or continuously, the motor 64 is rendered inoperative the instant the damper reaches full closed position inasmuch as the motor circuit is then opened by the circuit interrupter 75 under the action of the cam 68, which moves into open circuit position with relation to the circuit interrupter 75 as the damper 65 assumes its full closed position.

From the foregoing description, it will be understood that the system embodying the present invention provides for modulation in the operation of the motor 64, so that incident to temperature variations between limits, which may be varied or predetermined by adjusting the contacts 27 and 28, the damper 65 will be moved step by step toward its full opened or its full closed position, depending upon whether a normal drop or a normal rise in temperature is encountered, and further provides for uninterrupted movement of the damper to its full opened or full closed position in response on the one hand to an abnormal drop, and on the other hand to an abnormal rise in temperature. In other words the system is such that it automatically changes its mode of operation to meet the particular temperature conditions encountered, as will be especially appreciated when it is taken into account that if the system is operating under abnormal temperature conditions and normal temperature conditions are encountered, the mode of operation is altered to advantage in that the motor 64 is rendered intermittently operative; whereas if the system is operating under normal temperature conditions and abnormal temperature conditions are encountered, the mode of operation is altered to advantage in that the motor is rendered continuously operative. By reason of the fact that the system is self-conditioning to meet both normal and abnormal temperature conditions, it follows that a nicety in the regulation of the delivery of heat from its source to the point where it is to be utilized may be effected.

Without departing from the spirit of the invention, it is possible to substitute for the circuit interrupter 35 the modified form of circuit interrupter 35', which is shown in Fig. 5 and characterized by the fact that it includes an adjustable contact 94 which is adapted to cooperate with a contact 95, carried by a bi-metallic element 96 with which is associated a heating coil 97, the heating coil being connected to the contact 95 and adapted to be connected to the spring fingers 22 and 24 of the thermostat 17 by a conductor 82' which corresponds to the conductor 82 of Fig. 1. The contact 94 is connected by a conductor 81' to a conductor 78', which conductors correspond to the conductors 81 and 78 of Fig. 1 and are adapted to be employed in establishing current connections with the secondary winding of the transformer 30. In order that the timing of the circuit interrupter 35' may be adjusted to suit varying conditions, there is interposed between the conductors 78' and 81' a rheostat or variable resistance 98. By adjusting this resistance, the current flowing through the heating coil 97, from the secondary winding of the transformer 30 to which the conductor 78' is adapted to be connected, may be varied, and consequently the time required for the heating coil to move its contact 95 out of engagement with the contact 94 may be accordingly varied. In this connection it will also be observed that by adjusting the contact 94 in conjunction with the rheostat 98 further nicety in variation of the time required for the heating coil 97 to move the contact 95 out of engagement with the contact 94 may be attained.

In view of the foregoing description of the modified form of circuit interrupter 35', it is believed unnecessary to elaborate on its operation other than to point out that its contacts 94 and 95 are normally closed, and that the circuit under the control of the interrupter is not opened until the circuit in which the heating coil 97 is disposed is closed as by the thermostat of Fig. 1 in conjunction with which the modified form of the circuit interrupter is adapted to function.

Although the system herein illustrated as embodying the invention is designed to control the delivery of heat from its source to the point or location at which it is to be utilized, it will be understood that the invention may be adapted for the control generally of atmospheric conditions, and it will be further understood that although only one modification is herein shown and described, various changes in the system generally and in apparatus units particularly may be made without departing from the spirit of the invention or the scope of the following claims.

What is claimed is:

1. In a regulating system adapted to function in response to changes in atmospheric conditions, a reversible motor having a pair of motor circuits one of which when energized effects rotation of the motor in one direction and the other of which when energized effects rotation of the motor in an opposite direction, a limit switch including a pair of circuit interrupters interposed in said motor circuits, an actuator under the control of said motor and controlling the operation of said circuit interrupters, a normally open motor control switch adapted to be moved in one direction to close one of said motor circuits and to be moved in an opposite direction to close the other of said motor circuits, a pair of solenoids, one of which is adapted to move said motor control switch in one direction and the other of which is adapted to move said motor control switch in the other direction, a control circuit having branches individual to said solenoids, switching means operable incident to a normal positive change in atmospheric conditions to close said control circuit by way of one of said branches and operable incident to a normal negative change in atmospheric conditions to close said control circuit by way of the other of said branches whereby said motor-control switch is actuated on the one hand to close one of said motor circuits and, on the other hand, to close the other of said motor circuits, a circuit control device operating to intermittently open said control circuit when such circuit is completed incident to a normal change in atmospheric conditions.

2. In a regulating system adapted to function in response to changes in atmospheric conditions, a reversible motor having a pair of motor circuits one of which when energized effects rotation of the motor in one direction and the other of which when energized effects rotation of the motor in an opposite direction, a limit switch including a pair of circuit interrupters interposed in said motor circuits, an actuator under the control of said motor and controlling the operation of said circuit interrupters, a normally open motor control switch adapted to be moved in one direction to close one of said motor circuits and to be moved in an opposite direction to close the other of said motor circuits, a pair of solenoids, one of which is adapted to move said motor control switch in one direction and the other of which is adapted to move said motor control switch in the other direction, a control circuit having branches individual to said solenoids, switching means operable incident to a normal positive change in atmospheric conditions to close said control circuit by way of one of said branches and operable incident to a normal negative change in atmospheric conditions to close said control circuit by way of the other of said branches whereby said motor-control switch is actuated on the one hand to close one of said motor circuits and, on the other hand, to close the other of said motor circuits, a circuit control device operating to intermittently open said control circuit when such circuit is completed incident to a normal change in atmospheric conditions, and a circuit closer functioning in response to an abnormal positive change in atmospheric conditions on the one hand and in response to an abnormal negative change in atmospheric conditions on the other hand to render said circuit control device ineffective on said control circuit so long as abnormal atmospheric conditions prevail.

JOHN T. MIDYETTE, Jr.